(12) United States Patent
Daly et al.

(10) Patent No.: US 6,890,997 B2
(45) Date of Patent: May 10, 2005

(54) POWDER COATING OF FREE RADICAL CURABLE EPOXY RESIN AND ANOTHER FREE RADICAL CURABLE RESIN

(75) Inventors: Andrew T. Daly, Sinking Spring, PA (US); Navin Shah, Sinking Spring, PA (US); Richard A. Kraski, Jr., Pittsburgh, PA (US)

(73) Assignee: Rohm and Haas Company, Philadelphia, PA (US)

( * ) Notice: Subject to any disclaimer, the term of this patent is extended or adjusted under 35 U.S.C. 154(b) by 199 days.

(21) Appl. No.: 10/324,560

(22) Filed: Dec. 19, 2002

(65) Prior Publication Data

US 2004/0068027 A1 Apr. 8, 2004

Related U.S. Application Data

(63) Continuation-in-part of application No. 10/267,558, filed on Oct. 8, 2002, now Pat. No. 6,777,027.

(51) Int. Cl.$^7$ ............................. B05D 3/02; B32B 27/36; B32B 27/38; C09D 163/10; C09D 167/06
(52) U.S. Cl. .................. 525/438; 264/211.13; 427/195; 427/201; 428/413; 428/417; 428/418; 525/404; 525/438; 525/449; 525/454; 525/531
(58) Field of Search ................................ 427/195, 201, 427/559; 428/413, 417, 418; 525/192, 194, 196, 451, 404, 438, 449, 454, 531; 264/211.13

(56) References Cited

U.S. PATENT DOCUMENTS

| | | | |
|---|---|---|---|
| 4,129,488 A | 12/1978 | McGinniss | 204/159.19 |
| 5,789,039 A | 8/1998 | Biller et al. | 427/508 |
| 5,824,373 A | 10/1998 | Biller et al. | 427/474 |
| 5,922,473 A | 7/1999 | Muthiah et al. | 428/481 |
| 6,005,017 A | 12/1999 | Daly et al. | 522/20 |
| 6,017,593 A | 1/2000 | Daly et al. | 427/559 |
| 6,028,212 A | 2/2000 | Shah et al. | 560/115 |
| 6,054,250 A | 4/2000 | Sitzmann et al. | 430/280.1 |
| 6,136,882 A | 10/2000 | Daly et al. | 522/107 |
| 6,235,228 B1 | 5/2001 | Nicholl et al. | 264/255 |
| 6,294,610 B1 | 9/2001 | Daly et al. | 525/119 |
| 6,348,242 B1 | 2/2002 | Daly et al. | 427/558 |
| 6,632,481 B1 * | 10/2003 | Blum et al. | 427/496 |
| 2003/0087029 A1 * | 5/2003 | Decker et al. | 427/195 |

FOREIGN PATENT DOCUMENTS

| | | |
|---|---|---|
| DE | 19835867 A | 2/2000 |
| DE | 19835917 * | 2/2000 |
| EP | 0 636 669 A2 | 2/1995 |
| EP | 0844286 | 5/1998 |
| EP | 1129788 A | 9/2001 |
| WO | WO 98/36323 | 8/1998 |
| WO | WO00/08109 | 2/2000 |
| WO | WO02/100957 A | 12/2002 |
| WO | WO03/010248 A | 2/2003 |

OTHER PUBLICATIONS

Sitzmann, E. V. et al, "Combining vinyl ethers with acrylates for enhanced performance in UV cured coatings"; Allied-Signal Inc., Preprint of articles to be presented at RadTech'98 (Chicago) Apr. 1998.

Misev, T. A., van der Linde, R., "Powder coatings technology: new developments at the turn of the century"; Progress in Organic Coatings (34); Elsevier Science S.A.; pp. 160–168, 1998.

* cited by examiner

*Primary Examiner*—Robert Sellers
(74) *Attorney, Agent, or Firm*—Andrew E. C. Merriam

(57) ABSTRACT

The present invention provides ultraviolet (UV) curable powders for powder coatings comprising one or more than one free radical curable epoxy resin and one or more than one second free radical curable resin, or, alternatively, one or more than one free radical curable unsaturated polyester resin in combination with one or more than one wax, and one or more than one free radical photoinitiator, wherein the coating powder has an average particle size of 5 to 25 microns. Further, the present invention provides a method for making a powder for thin (1.0 to 4.0 mil), smooth coatings having an average particle size of from 5 to 25 microns, the method preferably comprising jet milling dry powder or spray drying an aqueous emulsion, fluid mixture, or a supercritical suspension of a powder or of the composition for making the powder. Still further, the present invention provides a method of making a powder coating comprising applying the powder to a substrate, preferably hardwood, heat fusing the applied powder, and UV curing at a temperature and for an amount of time sufficient to form a powder coating having a low gloss finish.

10 Claims, No Drawings

POWDER COATING OF FREE RADICAL CURABLE EPOXY RESIN AND ANOTHER FREE RADICAL CURABLE RESIN

FIELD OF THE INVENTION

This application is a continuation-in-part of U.S. application Ser. No. 10/267,558, filed on Oct. 8, 2002 now U.S. Pat. No. 6,777,027. This invention relates to ultraviolet radiation curable powders and, more particularly, to powders that give powder coatings having a smooth, low gloss finish, methods for forming such powders, and the powder coatings formed thereby.

BACKGROUND OF THE INVENTION

Thermosetting coating powders are dry, finely divided, free-flowing solid materials at room temperature. Coating powders find particular utility in industrial coating applications because they are readily applied to a variety of conductive substrates, they use very little or no organic solvents, and excess coating powders can be readily recycled.

One class of curable coating powders is ultraviolet (UV) radiation curable powders. UV curable powders have the ability to flow, cure, and produce smoother coatings at much lower temperatures than previously possible with traditional thermosetting chemistry. This is primarily due to the curing reaction being triggered by photoinitiated radiation rather than heat. Typically, UV curable powders are formulated from solid unsaturated base resins with low glass transition temperatures ($T_g$), such as unsaturated polyesters, unsaturated co-polymerizable cross linking resins such as vinyl ethers, photoinitiators, flow and leveling agents, performance-enhancing additives, and, optionally, pigments and fillers.

During coating operations, the parts are preferably preheated to drive out substrate volatiles, then UV curable powders are applied to a substrate, e.g. using electrostatic spray techniques. The coated substrate is then heated to fuse the powders into a smooth molten coating. Light, which cures and hardens the coating into a durable, smooth, attractive coating. However, because of the very rapid cure of UV curable coatings, it has been difficult to obtain a low gloss, smooth UV cured coating and the coatings so formed tend to have a relatively high gloss appearance. For reasons of aesthetic preference and commercial application, low gloss coatings are desirable for certain applications. Generally, gloss reduction can be obtained in traditional powder coatings through the introduction of matting agents, such as fillers or waxes, which rise to the surface during curing and cause matting through disruption of the surface of the coating. However, because UV curable powders cure so quickly, there is not adequate time for the fillers and waxes to flocculate to the surface, and they become trapped within the coating. There is reduction in flow in the coating but little matting takes place. Higher amounts of filler or waxes may be used, but this tends to cause the powders to block or cake during normal storage and/or produce coatings with severe orange peel, limiting the amount of gloss reduction that could be attained.

U.S. Pat. No. 6,348,242 discloses UV curable powder coatings containing crystalline components, wherein the heat fused powder is further heated to flow out the crystalline components, followed by cooling to recrystallize them to form a low gloss finish prior to UV curing the coating. However, reliance on crystalline resins to provide film continuity or appearance properties of the coatings adds costly recrystallization processing to the formation of the powder and leads to powders lacking in storage stability.

Accordingly, there remains a need for UV curable powders that form powder coatings with a low gloss. In accordance with the present invention, the present inventors have found powders that are resistant to blocking and that give surprisingly durable, low gloss, smooth UV cured powder coatings.

SUMMARY OF THE INVENTION

In a first aspect, the present invention provides a UV curable powder for powder coatings comprising one or more than one free radical curable epoxy resin and one or more than one second free radical curable resin, and one or more than one free radical photoinitiator, or, alternatively, one or more than one free radical curable unsaturated polyester resin in combination with one or more than one wax, and one or more than one free radical photoinitiator, wherein the coating powder has an average particle size of from 5 to 25 microns, preferably from 5 to 20 microns. Preferably, the powder comprises both of the one or more than one free radical curable unsaturated polyester resin in combination with one or more than one wax and the one or more than one free radical curable epoxy resin. More preferably, the powder composition further comprises one or more than one crystalline crosslinker resin, such as a vinyl ether resin, has a narrow particle size distribution and has a particle size polydispersity (pD) of from 1.5 to 4.5.

In a second aspect, the present invention provides a method of making a smooth, optionally microtextured, coating, comprising disposing a layer of the coating powder according to the first aspect of the present invention onto a substrate; fusing the disposed powder layer with heat to form a powder coating; and UV curing the powder coating to achieve a gloss level of below 60, preferably 1 to 50, on a Gardner Gloss scale. In a third aspect, a powder coated article is made according to the method of the second aspect of the present invention.

In a fourth aspect of the present invention, a method of making a low particle size pD powder to give a smooth, low gloss UV cured finish comprises one or more of the group consisting of forming an emulsion of a powder composition according to the present invention, followed by spray drying said emulsion; extruding a powder composition in a supercritical fluid to form a supercritical suspension, followed by spray drying said supercritical suspension; extruding a powder composition in a supercritical fluid in the presence of a cosolvent to form a supercritical suspension, followed by spray drying said supercritical suspension; extruding a powder composition to form an extrudate, followed by jet milling the extrudate; and combinations thereof. Preferably, a powder composition is extruded in supercritical fluid, with or without a cosolvent, to form a supercritical suspension, followed by spray drying said supercritical suspension.

DETAILED DESCRIPTION

For purposes of better defining the coating powder and powder coating, the coating powder, powder or powder coating composition refers herein to the particulate material, and the powder coating refers to the coating applied to a substrate or article.

As used herein, unless otherwise indicated, the phrase "per hundred parts resin" or "phr" means the amount, by weight, of an ingredient per hundred parts, by weight, of the total amount of resin contained in a coating powder, including cross-linking resins.

In the most preferred embodiment of the present invention, a UV curable powder that provides smooth coatings having a low gloss appearance of below 60 on a 60° Gardner Gloss scale, comprises one or more than one free radical curable epoxy resin, one or more than one free radical curable unsaturated polyester resin as a second free radical curable resin, one or more than one free radical photoinitiator, one or more than one crystalline crosslinker resin, and one or more than one wax. Aside from unsaturated polyester resins, other second free radical curable resins may include (meth)acrylourethanes, vinyl esters, allyl ethers, allyl esters, or mixtures thereof. The term "(meth)acrylate" used herein means acrylate, methacrylate, and mixtures thereof and the term "(meth)acrylic" used herein means acrylic, methacrylic, and mixtures thereof.

Because of the excellent weatherability and flexibility of unsaturated polyester resins, a preferred powder composition for providing low gloss, weatherable coatings comprises one or more than one unsaturated polyester resin in combination with one or more than one wax, one or more than one photoinitiator and one or more than one crystalline crosslinker resin. The powder composition can further comprise other free radical curable resins, including (meth) acrylourethanes, vinyl esters, allyl ethers, allyl esters, or mixtures thereof.

Additional components such as heat-activated catalysts, pigments, fillers, flow control agents, dry flow additives, anticratering agents, surfactants, texturing agents, light stabilizers, matting agents, photosensitizers, wetting agents, anti-oxidants, plasticizers, opacifiers, stabilizers, and degassing agents can also be present. More particularly, low gloss luster can be achieved without the use of additives and/or fillers that can cause the resultant coating to cake and/or peel.

The powder composition employs a free radical curing mechanism. In free radical curing mechanisms, the reactive functionality of the resin reacts during cure by means of free radical (uncharged) intermediate species. The resin itself may be a polymer, oligomer, or monomer that has at least two unreacted functional groups capable of crosslinking, polymerizing, or other reaction that leads to the coating. Accordingly, free radical curable resins generally have, on average, at least two ethylenically unsaturated groups per molecule bound, for example, to an aliphatic, aromatic, cycloaliphatic, araliphatic, or heterocyclic structure; or to an oligomer or polymer such as, for example, an epoxy resin or polymer, a polyester, a polyurethane, a polyether, a polyolefin, a polycarbonate, or (meth)acrylic polymer.

Suitable free radical curable resins include, for example, unsaturated polyesters, (meth)acrylate-functional resins such as (meth)acrylate functional epoxy resins or epoxy polymers, (meth)acrylourethanes, vinyl esters, allyl ethers, allyl esters, or mixtures comprising at least one of the foregoing. A wide variety of free radical curable epoxy resins may be used in the powders of the present invention. Suitable epoxy resins have a glass transition temperature ($T_g$) of from 30 to 150 degrees C. Examples of suitable (meth)acrylate-functional epoxy resins may include (meth)acrylate-functional epoxy resins, for example, an aliphatic, aromatic, cycloaliphatic, araliphatic or heterocyclic epoxy structure together with at least two (meth)acrylate groups. Exemplary useful structures are based on either monocylic phenols, for example on resorcinol or hydroquinone, or on polycyclic phenols, for example bisphenol F or bisphenol A. Methacrylate containing resins that further comprise unsaturated side chains, for example allyl, vinyl, or vinyl ether groups may be used. In one preferred embodiment, an epoxy (meth)acrylate, is used in combination with unsaturated polyester resins. More preferably, the epoxy acrylate and unsaturated polyester is mixed with a crystalline crosslinker resin. These materials are usually formed by reacting (meth)acrylic acid ((M)AA) with epoxy backbones.

Suitable epoxy backbone resins include, for reaction with (M)AA, for example, aromatic epoxides including groups such as bisphenol A, bisphenol F, bisphenol S, and the like, as generally illustrated in Formula (1):

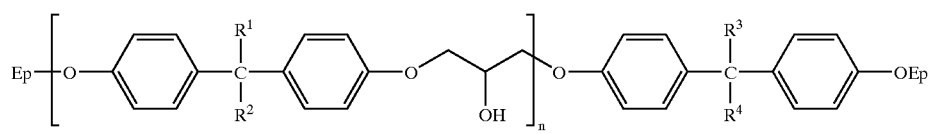

(1)

wherein $R^1$, $R^2$, $R^3$, and $R^4$ is each independently an aliphatic $C_1$–$C_6$ hydrocarbon or fluorohydrocarbon, preferably methyl; n=1–8, preferably 1–4; and Ep is an epoxide generally comprising the following structure (2):

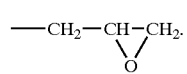

(2)

Suitable commercial epoxide resins are exemplified by solid bisphenol A epoxy resins available under the trade names "GT-9013", "GT-7072" and "GT-6259", from Vantico.

The unsaturated polyesters may be formed in a conventional manner from di- or polyfunctional carboxylic acids (or their anhydrides) and di- or polyhydric alcohols. The unsaturation is typically supplied by the carboxylic acid, although it is possible to supply it through the alcohol. Monohydric alcohols, e.g. lower alkanols, or monofunctional carboxylic acids (or their esters) may be employed for chain termination purposes. Suitable monofunctional acids for chain termination include, for example, acrylic acid, methacrylic acid, and the like.

Suitable ethylenically unsaturated di- or polyfunctional carboxylic acids (or their anhydrides) include, for example, maleic anhydride, fumaric acid, itaconic anhydride, citraconic anhydride, mesaconic anhydride, aconitic acid, tetrahydrophthalic anhydride, nadic anhydride, dimeric methacrylic acid, and the like, with maleic anhydride, fumaric acid, or their mixtures being preferred. Aromatic and saturated acids may be employed in conjunction with the unsaturated acids to reduce the density of the ethylenic unsaturation and provide the desired chemical and mechanical properties.

Suitable aromatic or saturated di- or polycarboxylic acids (or their anhydrides) include, for example, adipic acid, succinic acid, sebacic acid, malonic acid, glutaric acid, cyclohexane dicarboxylic acid, dodecane dicarboxylic acid, phthalic anhydride, isophthalic acid, terephthalic acid, tetrahydrophthalic acid, hexahydrophthalic acid, trimellitic acid, pyromellitic anhydride, and the like.

Suitable di- or poly-hydric alcohols include, for example, ethylene glycol, diethylene glycol, triethylene glycol, propanediol, butanediol, neopentyl glycol, cyclohexanedimethanol, hexanediol, 2-n-butyl-2-ethyl-1,3-propanediol, dodecanediol, bisphenol A, hydrogenated bisphenol A, trimethylol propane, pentaerythritol, and the like.

Exemplary unsaturated polyesters include the maleate diesters and fumarate diesters of Formulas (5) and (6) respectively:

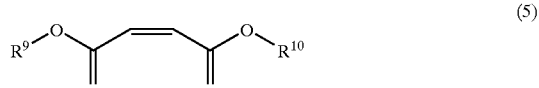

(5)

(6)

wherein $R^9$, $R^{10}$, $R^{11}$ and $R^{12}$ are each independently oligomers or polymers consisting of glycols and mono or polybasic acids.

Preferably, the unsaturated polyester resins are solid materials at room temperature, and can be easily formulated into powders or particulate form. Further, the preferred resins exhibit virtually no cold flow at temperatures up to 90° F. (34° C.) for desired long shelf life. They also have a $T_g$ below the flow temperature required for preservation of heat sensitive substrates, e.g. 40° C. or more, preferably 45° C. (113° F.) to 149° C. (300° F.). The resins may be crystalline, semi-crystalline, or amorphous, or a combination of these forms may be used. Suitable unsaturated polyester resins generally have a weight average (Mw) molecular weight of 400 to 10,000, preferably 1,000 to 4,500. The degree of unsaturation is typically 2 to 20 weight percent (wt. %), preferably 4 to 10 wt. %, based on the weight of the unsaturated polyester resin. Furthermore, whether the unsaturated polyester resin contains hydroxyl functional groups or acid functional groups depends upon the —OH/—COOH molar ratio of the monomer mix. The resins containing hydroxyl functional groups may have a hydroxyl number of 5 to 100, while the resins containing acid functional groups may have an acid number of 1 to 80. For use in aqueous emulsion processing to make powders having a narrow particle size distribution, preferred unsaturated polyesters have an acid number of from 50 to 80.

Crystalline crosslinker resins increase the crosslinking density and improve the flow of coatings made therefrom. Suitable crystalline crosslinker resins have at least two free radical curable sites, e.g. unsaturated groups, per molecule and may include, for example, divinyl ether resin, an allyl ether resin, or mixtures and combinations thereof. The $T_g$ or the melting point of crystalline crosslinker resins useful in the present invention ranges from 40 to 120 degrees C., preferably from 40 to 60 degrees C.

Crystalline crosslinker resins preferably comprise vinyl ethers which have the following formula (3)

(3)

wherein $R^4$ is an aliphatic, aromatic, cycloaliphatic, araliphatic or heterocyclic group, optionally further comprising one or more than one functional group such as ether, polyether, ester, polyester, urethane, polyurethane, or a combination comprising at least one of the foregoing groups or functional groups; and n=2–10, preferably 2–4. A divinyl ether resin useful in the present invention is URACROS® ZW 3307, from DSM, N.V., The Netherlands.

Suitable crystalline vinyl ether resins include, for example, cyclohexanedimethanol divinylether, diethyleneglycol divinylether, ethyleneglycol divinylether, hexanediol divinylether, tetraethyleneglycol divinylether, trimethylolpropane trivinylether, polyalkylene glycol divinyl ether, divinyl ether terephthalates, such as bis((4-ethenyloxy) butyl)terephthalate, bis((4-ethenyloxy)butyl) 1,3-benzendicarboxylate, and tris(4-(ethenyloxy)butyl) 1,3,5-benzenetricarboxylate, and chain extended vinyl ethers. Suitable commercially available chain extended vinyl ethers include the Pluriol-E200 divinyl ether (PEG200-DVE), and poly-THF290 divinylether (PTHF290-DVE) from BASF Corp. In addition, suitable crystalline vinyl ether resins include divinyl ether terminated crystalline urethanes. These resins are available as crystalline resins formed from the reaction of vinyl ethers containing hydroxyl functional groups, such as hydroxybutyl vinyl ether, with crystalline diisocyanates, such as hexamethylene diisocyanate, hydrogenated methylenebis(cyclohexyl)diisocyanate, or biurets or uretdiones thereof. A preferred crystalline crosslinker resin comprises divinyl ether terminated hexamethylene diisocyanate. These resins find particular utility as crosslinking agents for the unsaturated polyester resins, described above.

Allyl ester crystalline crosslinking resins may also be employed, such as the reaction product of allyl alcohol and crystalline carboxylic acids (or their anhydrides), typically phthalic anhydride. Standard allyl ester resins include the reaction product of an allyl ester, such as allyl propoxylate, and a hydrogenated methylene diisocyanate. These resins find particular utility for use with the unsaturated polyester resins, described above.

In the powder compositions of the present invention, the proportion of one or more than one free radical curable epoxy resin may range from 5 to 60 phr, combined with from 5 to 95 phr of one or more than one second free radical curable unsaturated resin. Further, the proportion of one or more than one unsaturated polyester resin may range from 5 to 100 phr in combination with from 0 to 95 phr of one or more than one other free radical curable unsaturated resin.

The relative amounts of free radical curable resin to crystalline crosslinker resin in the powder will depend on the choice of materials employed. Generally, such materials are employed in stoichiometric equivalent amounts to allow cross-linking to proceed to substantial completion, although an excess of either can be used if desired. From 1 to 50 phr of one or more than one crystalline crosslinker resin, preferably from 2 to 25 phr, and more preferably from 5 to 20 phr may be used in the powder of the present invention.

Suitable commercial embodiments of free radical curable resins include, for example, an unsaturated polyester resin commercially available under the trade name P-3125 from DSM, N.V., The Netherlands, and also under the trade name VAN-1743 from the Solutia; an acrylourethane resin commercially available under the trade name Viaktin 3546 from Solutia; PIOESTER 275, PIONEER P-1942, and P-1937, all from Pioneer Plastics, Auburn, Me.; ATLAC 363E, ATLAC 352, and DION 6694 ES, all from Reichold, Research Triangle Park, N.C.; and the unsaturated polyester resin available under the trade name Viaktin® 3890 from Solutia. Suitable free radical photoinitiators for use in the coating powder according to the present invention include, for example, alpha-cleavage photoinitiators, hydrogen abstraction photoinitiators, and the like. Suitable alpha-cleavage photoinitiators include, for example, benzoin, benzoin ethers, benzil ketals such as benzil dimethyl ketal, monoacyl phosphines, bisacylphosphine oxides such as diphenyl (2,4, 6-trimethyl benzoyl)phosphine oxide, aryl ketones such as 1-hydroxy cyclohexyl phenyl ketone, and the like. Suitable hydrogen abstraction photoinitiators include, for example, Michler's ketone, and the like, and dimethoxy phenyl acetophenones, and the like. Other examples of free radical photoinitiators include benzophenones, or acetophenone derivatives, such as alpha-hydroxyalkylphenylketones. Examples of radical photoinitiators useful in the present invention are 1-hydroxycyclohexyl phenylketone, available under the trade name IRGACURE 184®; 2,2-dimethoxy-2-phenyl acetophenone, available under the trade name IRGACURE 651®; or 2-hydroxy-ethoxyphenyl-2-hydroxy-2-methylpropane-1-one, available under the trade name IRGACURE® 2959, each from Ciba-Geigy, Tarrytown, N.Y.

An effective total photoinitiator content of the powder coating can be readily determined by one of ordinary skill in the art, depending upon the types of free radical curable polymer systems employed, the amount of other constituent components, and the other properties desired in the coating. In general, however, an effective quantity of the total amount of the free radical photoinitiator is 0.1 to 10 phr, preferably 0.5 to 7.5 phr, and most preferably 1 to 3 phr.

Waxes useful in the powder compositions of the present invention may comprise polyolefin, epoxidized polyolefin, polytetrafluoroethylene, and hydrocarbon waxes, such as polyethylene, polypropylene, oxidized polyethylene, oxidized polypropylene, microcrystalline polyolefin wax, paraffin, montan wax or carnauba wax, wherein said waxes have a $T_g$ or a melting point of from 40 to 120 degrees C. Preferably, the one or more than one wax comprises polyethylene wax. Amounts of wax may range from 0.1 to 6.0 phr, preferably 0.5 to 3 phr.

Preferably, the components of the coating powder are processed in the solid phase to avoid potential processing difficulties. For example, particles containing any excess solvent may experience clumping, thus impeding the processing and application of the coating powder to the substrate. Generally, some of the above-mentioned photoinitiators are supplied by commercial vendors in the form of approximately 50% solids in a solvent. To most effectively utilize these photoinitiators, including all other components contained in solvent, these components undergo preliminary evaporation or other processing steps to convert these materials to powder or particulate form.

To enhance the cross-linking rate during cure, thermal catalysts may optionally be employed. The inclusion of thermal free-radical initiators has been found to assist in curing near the substrate, particularly when pigmented, opaque, or thick film coatings are desired. Suitable catalysts include, for example, peroxides such as peroxy ketals such as 1,1-bis(t-butyl peroxy)-3,3,5-trimethylcyclohexane, diacylperoxides such as benzoyl peroxide, peroxy esters and peroxy carbonates; and transition metal and magnesium compounds based on fatty acids, oils, or tertiary amines, preferably cobalt soaps, such as cobalt octoate, cobalt neodecanoate, cobalt naphthenate, and cobalt octadecanoate. An effective amount of catalyst can be readily determined by one of ordinary skill in the art, depending upon the amount of cross-linking desired, types of free radical curable polymer systems employed, and amounts of polymer in the coating powder. In general, an effective quantity of peroxide catalyst may range from 0.01 to 5 phr, preferably from 0.05 to 3 phr, more preferably from 0.1 to 2 phr, and most preferably from 0.5 phr to 2 phr. In addition, effective quantities of metal catalyst may range from 0.01 to 1 phr, preferably 0.05 to 0.75 phr, and most preferably 0.1 phr to 0.5 phr.

Additives to aid or enhance the chemical and physical properties of the powder coating may be included such as pigments, fillers, flow control agents, dry flow additives, anticratering agents, surfactants, light stabilizers, plasticizers, degassing agents, wetting agents, anti-oxidants, matting agents, and non ionic surfactants, such as fluorinated non ionic surfactants, such as FLUORAD TM FC-4430 fluoroaliphatic polymeric esters from 3M Specialty Materials, St. Paul, Minn., and the like.

Suitable pigments include, for example, titanium dioxide, iron oxide red, iron oxide yellow, phthalocyanine green, phthalocyanine blue, blue tone phthalocyanine green, yellow tone phthalocyanine green, green tone phthalocyanine blue, lamp black, carbon black, silica, metal oxides, mixed metal oxides or combinations comprising at least one of the foregoing pigments. Suitable fillers include, for example, calcium carbonate, barium sulfate, wollastonite, mica, china clay, diatomaceous earth, benzoic acid, low molecular weight nylon, or combinations comprising at least one of the foregoing fillers.

The amount of fillers and/or pigments may be varied depending upon the desired film opacity and coloration of the resultant coating. In general, effective quantities of fillers and/or pigments may range from 0 to 120 phr, preferably from 1 to 90 phr, more preferably from 1 to 30 phr. In a preferred embodiment, the low gloss powder coatings are clear to translucent and contain an accordingly low proportion of pigment, e.g. from 0 to 60 phr, or they contain a clear to translucent filler, pigment or colorant in the amount of 0 to 120 phr. Suitable flow control agents include, for example, acrylic resins, silicone resins, combinations comprising at least one of the foregoing flow control agents, and the like. A suitable flow control agent for use in the present invention is RESIFLOW® P-67, an acrylate flow modifier, from Estron, Calvert city, Ky. Suitable dry flow additives include, for example, fumed silica, alumina oxide, and the like, or combinations comprising at least one of the foregoing dry flow additives. Suitable anticratering agents include, for example, benzoin, benzoin derivatives, low molecular weight phenoxy and phthalate plasticizers, and the like, or combinations comprising at least one of the foregoing anticratering agents. Suitable surfactants include, for example, acetylenic diol, and the like. Suitable light stabilizers include, for example, hindered amines, hindered phenols, or combinations comprising at least one of the foregoing light stabilizers. In general, effective quantities of flow control additives, dry flow additives, anticratering agents, texturing agents, surfactants, or light stabilizers are individually from 0.1 to 15 phr, preferably from 0.5 to 5 phr.

The powder of the present invention may be produced or "processed" using conventional techniques. For example, the free radical curable resin, the free radical photoinitiator, crystalline crosslinker resin, thermal catalyst, and any additives may be mixed together, e.g. dry blended in the appropriate amounts. The mixture may then be blended to form a fluid mixture, such as a melt of powder forming ingredients or a dispersion of one or more powder forming ingredients in a melt of one or more powder forming ingredients, e.g. by extrusion with heating. A fluid mixture may preferably be formed blending below the melting point of any crystalline crosslinker present in the composition. The extruded composition is preferably rapidly cooled and broken into chips, and then ground in an air classifying mill, preferably with cooling, to a powder having an average particle size of less than 40 microns, preferably less than 25 microns, as determined by laser light scattering. Additionally, the once ground powder may be double ground to an average particle size of from 20 to 23 microns, which results in a smooth coating having a microtextured surface. If necessary, the once ground or double ground powders may be sorted according to size to provide coatings with consistent smoothness. The powders may be sorted by screening in a 270 to 400 mesh screen or by passing them through a cyclone classifier.

The average particle size of powder compositions preferably ranges from 5 to 25 microns, as determined by laser light scattering. Preferably, after extrusion or mixing the ingredients together and then cooling, the compositions, e.g. chips, are processed to provide a small average particle size of from 5 to 20 microns. Powders having small average particle sizes provide smooth coatings for use as translucent or clear coatings on natural wood and hardwood substrates such as maple, oak, walnut, mahogany, or cherry. In addition, the reduced particle size enables the provision of thinner coating films, e.g. of from about 0.5 to 6.0 mil, having improved smoothness and reduced outgassing. Still further, small particle size powders will give coatings having a good coverage in the open wood grain at a 1.0 to 2.0 mil thickness. Thus, the small sized powders of the present invention eliminate bridging effects in the open wood grain. To produce a smaller average particle size powder and a smooth coating, the processed compositions prior to particle formation, e.g. chips, may be jet milled, may be finely ground in an air classifying mill or conventional mill, followed by screening them through a 325 to 400 mesh screen, or may be spray dried to an average particle size, as determined by laser light scattering, of 5 to 20 micrometers, preferably from 8 to 20 micrometers, and more preferably from 8 to 16 micrometers.

The most preferred powder compositions have a narrow particle size distribution and a low average particle size polydispersity (pD) of from 1.5 to 4.5, preferably 1.5 to 3.0. Low pD powders have excellent handling and coatability properties despite their small particle size. Low pD powders may include those that are produced by spray drying a powder melt, a fluid mixture, an aqueous emulsion of a processed powder, or a suspension or dispersion of a processed powder, preferably as a suspension in high-pressure air or supercritical fluid.

To make aqueous emulsion of the powder of the present invention, any acid functional resin powder composition may be used which has been processed, e.g. as a melt, a fluid mixture, chips or a powder. For example, processed chips comprising at least 40 phr of an unsaturated polyester having an acid number of from 40 to 100, preferably 50 to 80, may be optionally pre-ground and then charged into aqueous ammonia or an aqueous solution of a lower (C2–C6) alkyl amine, optionally with stirring or shear, followed by heating to form a viscous emulsion having from 20 to 40 weight %, preferably 25 to 35 weight % solids. The resulting mixture may be heated to a temperature of from 30 to 80 degrees C., preferably from 45 to 70 degrees C., however less heat is required for resins having a higher acid number. The equivalent ratio of ammonia or lower alkyl amine to acid groups on the polymer or resin may range from 0.75 to 1.25, preferably from 0.9 to 1.1, and may be lower for resins have a higher acid number.

A supercritical suspension or dispersion of powder or a fluid mixture of ingredients for forming a powder may be formed by charging a "supercritical fluid" or SC fluid, i.e. one that has been pressurized or heated, or both, to a level at or above its critical point, to an apparatus containing the powder, fluid mixture, or aqueous emulsion of the present invention. The SC fluid and powder, emulsion or fluid mixture may be charged into any apparatus selected from the group consisting of an extruder, a gear pump, a melt pump, a static mixer, a homogenizer, a vessel used to form an aqueous emulsion, a spray nozzle, and, preferably, a combination thereof. Ingredients for forming a powder which have not yet been processed may be charged with SC fluid to extruder, gear pump or melt pump to form a fluid mixture which may be spray dried. Processed powders, SC suspensions, fluid mixtures and emulsions thereof may be charged directly to a spray dryer with SC fluid or high-pressure air.

SC fluid may be charged to an extruder either upstream of, concurrently with, or downstream of the point at which the ingredient's for making powder is charged into the extruder, or at any combination of those locations in the extruder. Supercritical extrusion of a powder may combine all ingredients of the powder composition in the same way as melt extrusion or melt blending, but at a lower extrusion temperature which may be from 10 to 100 degrees F. (6 to 54 degrees C.) below the $T_g$ or the melting point of the resin in the powder composition. Such a process may nearly or fully eliminate chemical reaction during extrusion or melt processing and may prevent the undesirable melting of crystalline resin during processing. Preferably, only a portion of the SC fluid used in processing is charged to an extruder, and the remainder of the SC fluid is charged to a second or third apparatus, e.g. a gear pump, melt pump, static mixer, homogenizer, or spray nozzle, located downstream of the extruder.

To enable the processing of higher viscosity materials, e.g. high $T_g$ resins and fillers, at lower temperatures, powder forming ingredients or a fluid mixture or aqueous emulsion and all or a portion of SC fluid may be charged to a gear pump or melt pump. This enables powder melt processing without any damaging reduction in viscosity of the melt mixture in an extruder and can enable processing of very high melting or difficult to dissolve solids, e.g. pigments, because the pumps provide additional pressure to dissolve powder components and a pressure increase prior to spraying. Where a portion of SC fluid is charged to a pump, the remainder is preferably charged to a spray nozzle to make powder. Any gear pump or melt pump may be located downstream of an extruder in which powder forming ingredients are processed.

A portion of SC fluid may be charged to a static mixer or homogenizer located downstream of an extruder, wherein some or none of the SC fluid is charged, to further mix the various components of the powder composition, facilitate the reduction in the particle size of the powder and to facilitate pressure increase prior to subsequent spray drying. Where a portion of SC fluid is charged to a static mixer or homogenizer, the remainder is preferably charged to a spray nozzle to make powder.

When some or all of the SC fluid is charged to a spray nozzle located downstream of an extruder, melt pump or gear pump, vessel used to form an aqueous emulsion, static mixer or homogenizer, the fluid creates an atomizing force to enable fine spray drying of the powder, fluid mixture, aqueous emulsion or supercritical suspension which is charged to the nozzle. Alternatively, air may be used instead of SC fluid in air assisted spray drying. For example, high-pressure air may be charged to an air-assisted nozzle along with an emulsion, a fluid mixture, a supercritical suspension of powder or a fluid mixture, or a powder to create an atomizing force to enable fine spray drying. The spray dried product may comprise a powder or may comprise a powder coating on a substrate.

SC fluids suitable for use in the present invention may comprise carbon dioxide, ammonia, $N_2O$, methane, ethane, ethylene, propane, chlorotrifluoromethane, trifluoroethane, trifluoropropane and monofluoromethane. Preferably, SC fluid comprises carbon dioxide or propane. SC fluids may be used in the total amount of from 5 to 90 weight %, preferably from 20 to 80 weight % based on the total weight of resulting supercritical suspension. In supercritical extrusion, for example, SC fluid may preferably be used in the amount of from about 5 to 60 weight %, based on the weight of the resulting supercritical suspension, and the remainder of the SC fluid is then charged to one or more than one apparatus located downstream of the extruder. In supercritical spray drying, all of the SC fluid used in processing may be charged to the spray nozzle.

Cosolvents may combined with SC fluids. Such cosolvents may help to fully dissolve some components of a powder mixture in an extruder, gear pump or melt pump, static mixer, homogenizer or spray nozzle. A suitable cosolvent is any solvent or mixture of solvents which is miscible with the SC fluid and is a good solvent for a component of a powder composition. Suitable cosolvents may include tetrahydrofuran, ketones such as acetone, methyl ethyl ketone, methyl iso butyl ketone, cyclohexanone and other aliphatic ketones; esters such as methyl acetate, ethyl acetate, alkyl carboxylic esters; ethers such as methyl t-butyl ether, dibutyl ether, methyl phenyl ether, and other aliphatic or alkyl aromatic ethers; glycol ethers such as ethoxyethanol, butoxyethanol, propoxyethanol, butoxypropanol and other glycol ethers; glycol ether esters such as butoxyethoxy acetate, ethyl ethoxy propionate and other glycol ether esters; alcohols such as methanol, ethanol, propanol, 2-propanol, butanol, amyl alcohol and other aliphatic alcohols; and aromatic hydrocarbons such as toluene, xylene and other aromatics or mixtures of aromatic solvents; and nitro alkanes such as 2-nitro propane. Cosolvents may be added anywhere where SC fluid is present and may be added in the amount of from 0 to 50 weight %, preferably from 0 to 15 weight %, based on the total weight of the resulting supercritical suspension of powder.

According to the preferred method of making a powder, an emulsion of said powder may be spray dried, the powder may be extruded, pumped, homogenized or mixed in a supercritical fluid and, optionally in the presence of a cosolvent, to form a supercritical suspension, followed by spray drying said supercritical suspension, or, in a combination of preferred methods, an emulsion of the composition for making a powder may be dried and, optionally, processed in SC fluid in one or more than one of a pump, homogenizer, or static mixer, followed by spray drying said supercritical suspension.

To make a powder coating in accordance with the present invention, the coating powder is applied in the usual fashion, e.g., electrostatically, to an optionally pre-heated, pre-treated or primed substrate to be coated. A treated substrate may be heated up to 200 degrees F. (93 degrees C.), preferably from 165 to 185 degrees F. (74 to 85 degrees C.) to facilitate the even flow of the powder on the substrate. Small particle sized powders (5 to 20 microns average particle size) may be applied from a fluidized bed, a magnetic brush or a spray nozzle in SC fluid or an air assisted nozzle in high-pressure air. Generally, electrostatic spray booths are employed that house banks of corona discharge or triboelectric spray guns and recirculators for recycling over sprayed powders back into the powder feed.

The type of substrate is not particularly limited, and includes both heat-resistant substrates, such as metal, glass, steel, ceramic, carbon and graphite, and heat-sensitive substrates. Examples of heat-sensitive substrates include wood, such as natural woods like hardwood; hard board, laminated bamboo, wood composites, such as particle board, electrically conductive particle board, high, medium, or low density fiber board, masonite board, laminated bamboo, and other substrates that contain a significant amount of wood. These substrates may be filled, pre-treated, or primed with ultraviolet radiation curable liquids, powder primers, or solvent or waterborne coatings, such as antistatic agents to improve smoothness and reduce the required film buildups. Any solvent or water present on a substrate may be heat flashed off in the manner described in heat fusion prior to powder coating. Other suitable heat-sensitive substrates include, for example, plastics such as acrylonitrile butadiene styrene polymer resins (ABS), polyphenylene ether resins (PPO), sheet molded components (SMC), polyolefins, thermoplastic polyolefins (TPO), polycarbonates, acrylics, nylons, other copolymers which may warp or outgas when coated and heated with traditional heat curable coating powders, and paper, cardboard, and composites and components having a heat-sensitive aspect.

After it is coated on a substrate, the coating powder layer may be flowed out, for example, by exposure to infrared (IR) to create a coating having a more consistent profile.

Next, the coating powder layer is exposed to an amount of heat effective to fuse (i.e., melt) the powders into a continuous, smooth, molten film. The substrate may be heated at the time of application (pre-heated) and/or subsequently (post-heated) to effect heat fusion and film formation. Heating may be performed in infrared, convection ovens, or a combination of both. When coating heat sensitive substrates, such as wood articles, pre-heat and post-heat steps may be employed to enable faster melt and flow out. With plastic articles, pre heating is preferably eliminated to limit heat exposure and avoid plastic deformation.

Generally, heat fusion proceeds for a time effective to outgas substrate volatiles, which prevents surface defects such as blisters, craters, and pinholes from forming during curing. Preferably, the flow viscosity of the powder coating composition is sufficiently low to produce a smooth coating on the substrate. In accordance with the present invention, coated powders are heat fused for from 10 seconds to 10 minutes, preferably from 20 seconds to 5 minutes, and most preferably from 30 seconds to 3 minutes. Shorter heat fusion times are needed as the temperature of heat fusion is increased. In accordance with the present invention, coated powders are heat fused at from 120 to 350° F. (49 to 177° C.°), preferably from 150 to 300° F. (65 to 149° C.), and most preferably from 180 to 270° F. (82 to 132° C.). For example, powder coatings may be heat fused at from 250° F. (121° C.) to 270° F. (132° C.) for 1 minute.

After the coating powder is heat fused onto the substrate, it may be allowed to cool, and is then exposed to a radiation source effective to activate the photoinitiator. Preferably, exposure is to a standard ultraviolet light source, such as a standard medium pressure mercury-vapor lamp, iron doped mercury-vapor lamp, and/or gallium doped mercury-vapor lamp, e.g., 600-watt Fusion H-, D- and/or V-lamps, respectively, to rapidly cure the coating films into smooth, hardened, low gloss finishes. Visible light or electron beam radiation may be used instead of UV radiation, if desired. Activation and cure of the free radical initiators in the coating typically takes from 1 millisecond to 10 seconds, and typically less than 3 seconds, depending on the particular compositions and photoinitiators.

Coating powders are generally applied to achieve a powder coating thickness of from 0.5 mil (0.0122 millimeters, "mm") to 25 mils (0.635 mm), preferably from 1.0 to 6.0 mils (0.038 to 0.245 mm), more preferably from 1.0 to 4.0 mils (0.0245 mm to 0.102 mm). As mentioned above, the coatings are smooth, and have low gloss without use of matting agents that can disrupt the surface to the coating. They are also curable at very low temperatures, for example from 150 to 180° F. (65.6 to 82.2° C.).

Throughout the coating process prior to the cooling of an applied coating, the surface of the coated substrate should not exceed 200 degrees F. (93 degrees C.), and preferably should not exceed from 165 to 185 degrees F. (74 to 85 degrees C.) during any part of the coating process. So long as the coating is fused and cured, the lower the surface temperature of the substrate, the better the quality of the low gloss and smoothness properties in the product coating.

Some embodiments of the invention will now be described in detail in the following Examples.

Gloss was measured at 60° according to a modified version of ASTM D 523 by using a BYK Gardner Micro TRI gloss meter.

Methyl ethyl ketone resistance (MEK resistance), a rating of solvent resistance and an indication of crosslinking density, was measured as follows. A cotton swab was soaked in MEK and rubbed with moderate pressure in a back and forth stroking motion (a "double rub") 50 times. A relative rating was given on a scale of 1–5 with a rating of 5 defined as the most solvent resistant and a rating of 1 justified when the coating can be completely removed during the process to expose bare substrate. More specifically, a rating of 5 corresponds to no rub off, 4 to slight rub off, 3 to moderate rub off, 2 to severe rub off, and 1 to complete rub through to substrate.

PCI smoothness means a coating's smoothness when visually compared to a set of standards that assign a numerical rating from 1 (textured) to 10 (very smooth). PCI standards for smoothness are available from ACT Laboratories, Inc. of Hillsdale Mich.

Profilometry measures if the local variation of the coating along one linear centimeter by running the 12.5 micron in diameter ballpoint tip of a profilometer slowly along a 1 centimeter line on the surface of the coating. Local variation in a coating refers to the linear distance (height) in microns between a peak and its adjacent valley or between a valley and its adjacent peak.

EXAMPLE 1

A coating powder comprising the components in the amounts shown in Table 1 was prepared. The components were compounded and extruded using a PR-46 Buss co-kneader extruder at a temperature of 25° C. The extrudate was ground using a Brinkman grinder, and then screened through a 325 mesh screen to remove coarse particles.

TABLE 1

| Component | Parts Per Hundred Resin (phr) |
|---|---|
| Bisphenol A epoxy methacrylate | 20 |
| Unsaturated Polyester | 60 |
| Divinyl ether | 20 |
| Dimethoxy phenylacetophenone | 2.0 |
| Acrylic oligomer - Flow Modifier | 1.0 |

TABLE 1-continued

| Component | Parts Per Hundred Resin (phr) |
|---|---|
| Wax Matting Agent | 5.0 |
| Fluorinated Nonionic Surfactant | 0.5 |

The resultant coating powder was then electrostatically applied to a 6×6×¾ inch (15×15×1.8 centimeter) block of maple hardwood. The solid maple substrate was preheated for 30 seconds at 300° F. (149° C.) so that its surface temp reached 120 F. The coating powder was electrostatically applied to the substrate, followed by post heating to flow out for 30" using 50% (med. Wave) infrared heat (450° F., 232.2° C.) to achieve a surface temp of 165° F. (74° C.). The coating powder was then cured by exposure to a 600 watt V/H lamps for 1 second to form a powder coating having a film thickness of 1.0 to 1.6 mils and the following characteristics as shown in Table 2:

TABLE 2

| Test | Results |
|---|---|
| 60° Gardner Gloss | 25–35 units |
| MEK Resistance (50 double rubs) | No Rub Off (excellent) |
| Smoothness | 8 (PCI std) |

As shown in Table 2, the resulting powder coating possesses a low gloss finish as measured on a 60° Gardner Gloss scale. In contrast, a similar thermally cured coating would require a preheat of 10 minutes at 375° F. (190.6° C.) and a post heat of 5 minutes at 375° F. (190.6° C.) on one inch MDF, and would require 250 to 375° F. (121 to 190.6° C.) cure temperatures to yield similar results.

The coating powder of Example 1 can be applied at both lower preheat and post heat temperatures, are shown in and cured by ultraviolet at lower cure temperatures, than are shown in the Example.

EXAMPLES 2A and 2B

The powder formulation used in Example 1 was processed and coated in the same way as in Example 1, except that, prior to applying the coating, the coating powder was finely ground in a jet mill (Example 2A) and an Air Classifying Mill (Brinkmann Mill) (Example 2B). The powder coatings had the properties shown in Table 3.

TABLE 3

| | Powder Grinding Step | |
|---|---|---|
| | Example 2A | Example 2B |
| | Fluid Energy model 00 microjet mill | Brinkman Grind with a 0.5 mesh screen, 12 pin rotor, then High speed |
| Property | Grinding nozzle 90 psi Pusher nozzle 40 psi | Screened, 270 mesh |
| Thickness | 0.8–0.9 mils | 1.4–1.7 mils |
| Appearance | NO texture visible | Slight texture visible |
| 60 degree gloss | 19 | 14 |
| MEK resistance (50 double rubs) | Slight rub off | Slight Rub Off |
| Average particle size | 9.25 microns | 23.5 microns |
| Bridging in Grain | None | Slight |

As can be seen in Example 2A, a small particle size powder will surprisingly eliminate bridging in the open grain and provide a natural wood appearance powder prior to coating a substrate provides a very thin UV cured coating which has a very low gloss, good to excellent smoothness (appearance), and a remarkable MEK resistance for a UV cured clear powder coating on hardwood. As can be seen in Example 2B, grinding a powder in a Brinkman mill will significantly reduce bridging and provide a microtextured, smooth coating with minimal texture visible.

EXAMPLES 3 AND 4

Powder coatings were processed and applied in the same fashion as in Example 1 except that they were applied on a polished brass panel. In Example 3 they were double-ground in a Brinkman mill to an average particle size of 21 microns, and in Example 4 they were double-ground in an Brinkman mill and then screened through a 325 mesh screen to an average particle size of 20 microns.

Each of the coatings in Examples 3 and 4 provided a smooth, microtextured surface on hardwood and a low gloss. Each coating was one mil or 25.4 microns thick. In the coating of Example 3, profilometry data show that 87 percent of the local variations in the coating were less than six microns from peak to valley. In the coating of Example 4, profilometry data showed that 92 percent of the local variations in the coating were less than 4.5 microns from peak to valley.

What is claimed is:

1. A powder composition, comprising:
   one or more than one free radical curable epoxy resin having at least two ethylenically unsaturated groups per molecule and one or more than one second free radical curable resin other than a free radical curable unsaturated polyester resin, or, alternatively, one or more than one free radical curable unsaturated polyester resin in combination with one or more than one free radical curable epoxy resin or free radical curable epoxy polymer either having at least two ethylenically unsaturated groups per molecule
   one or more than one wax or matting agent;
   one or more than one free radical photoinitiator;
   one or more than one crystalline crosslinker resin having at least two free radical curable sites; and,
   optionally, a thermal cure catalyst,
   wherein the coating powder has an average particle size of 5 to 25 microns.

2. A powder composition as claimed in claim 1, wherein the said composition comprises the said one or more than one crystalline crosslinker resin in the amount of from 1 to 50 parts per hundred parts resin (phr).

3. A powder composition as claimed in claim 1, comprising 5 to 60 parts per hundred parts resin (phr) of said one or more than one free radical curable epoxy resin and 5 to 95 phr of said one or more than one second free radical curable resin.

4. A powder composition as claimed in claim 3, wherein said one or more than one second free radical curable resin has, on average, at least two ethylenically unsaturated groups per molecule bound to an aliphatic, aromatic, cycloaliphatic, araliphatic, or heterocyclic structure, or bound to an epoxy resin or polymer, a polyester, a polyurethane, a polyether, a polyolefin, a polycarbonate, or a (meth)acrylic polymer or oligomer.

5. The powder composition as in any one of claims 1–4, wherein said powder composition has a partide size polydispersity (pD) of from 1.5 to 4.5.

6. A method for making a coating having a low gloss finish, comprising:
   disposing a layer of a powder composition onto a substrate, said coating powder comprising:
   one or more than one free radical curable epoxy resin having at least two ethylenically unsaturated groups per molecule and one or more than one second free radical curable resin other than a free radical curable unsaturated polyester resin or, alternatively one or more than one unsaturated polyeser resin in combination with one or more than one free radical curable epoxy resin or free radical curable epoxy polymer either having at least two ethylenically unsaturated groups per molecule
   one or more than one wax or matting agent;
   one or more than one free radical photoinitiator;
   one or more than one crystalline crosslinker resin having at least two free radical curable sites; and,
   optionally, a thermal cure catalyst,
   further wherein the coating powder has an average particle size of 5 to 25 microns;
   fusing the disposed powder composition with heat to form a powder coating; and,
   curing said powder coating to achieve a gloss level of from 1 to 50 on a 60° Gardner Gloss scale.

7. A method for making a coating as claimed in claim 6, wherein the powder composition has a particle size polydispersity (pD) of from 1.5 to 4.5.

8. The method as claimed in claim 6, wherein the substrate comprises wood, hardwood, hard board, laminated bamboo, wood composites, particle board, electrically conductive particle board, high density fiber board, medium density fiber board, low density fiber board, masonite board, laminated bamboo, acrylonitrile butadiene styrene copolymers, polyphenylene oxide copolymers, sheet molded components, polyolefins, polycarbonates, acrylics, nylons paper, cardboard, metal, glass, steel, ceramic, carbon, graphite, or a combination comprising at least one of the foregoing substrates.

9. A powder coated article formed according to the method as claimed in any one of claims 6 to 8.

10. A method for making a powder composition as claimed in claim 5 comprising at least one selected from the group consisting of:
   forming an aqueous emulsion of said composition, followed by spray drying said emulsion to form a powder,
   extruding said composition in a supercritical fluid to form a supercritical suspension, followed by spray drying said supercritical suspension to form a powder,
   extruding said composition in a supercritical fluid in the presence of a cosolvent to form a supercritical suspension, followed by spray drying said supercritical suspension to form a powder, and,
   extruding said composition to form a fluid mixture, followed by spray drying said fluid mixture to form a powder.

* * * * *